United States Patent
Kim

(10) Patent No.: US 7,313,064 B2
(45) Date of Patent: Dec. 25, 2007

(54) OPTICAL DISK RECORDING AND REPRODUCING APPARATUS AND METHOD FOR DETERMINING OPTIMAL POWER THEREOF

(75) Inventor: Jae-hyun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 491 days.

(21) Appl. No.: 10/931,036

(22) Filed: Sep. 1, 2004

(65) Prior Publication Data

US 2005/0052976 A1    Mar. 10, 2005

(30) Foreign Application Priority Data

Sep. 9, 2003    (KR) .................... 10-2003-0063383

(51) Int. Cl.
*G11B 7/00*    (2006.01)
(52) U.S. Cl. .................................... 369/47.53
(58) Field of Classification Search ............. 369/53.53
See application file for complete search history.

(56) References Cited

U.S. PATENT DOCUMENTS

| | | | |
|---|---|---|---|
| 6,275,462 B1 * | 8/2001 | Masaki et al. ............... | 369/116 |
| 6,292,448 B1 * | 9/2001 | Yoshida et al. ............ | 369/53.27 |
| 6,359,846 B1 * | 3/2002 | Shoji et al. ................. | 369/47.5 |
| 6,418,102 B1 * | 7/2002 | Suga ........................ | 369/47.53 |
| 6,925,042 B2 * | 8/2005 | Nakajo ..................... | 369/47.53 |
| 6,958,962 B2 * | 10/2005 | Ogawa ..................... | 369/47.53 |
| 7,106,678 B2 * | 9/2006 | Yano et al. ............... | 369/53.26 |
| 2003/0156514 A1* | 8/2003 | Suzuki ..................... | 369/47.53 |
| 2004/0017750 A1* | 1/2004 | Hsu et al. ................ | 369/47.53 |
| 2004/0052176 A1* | 3/2004 | Narumi et al. ........... | 369/47.39 |

FOREIGN PATENT DOCUMENTS

| | | |
|---|---|---|
| CN | 1405758 A | 3/2003 |
| JP | 09-016964 | 1/1997 |
| JP | 11-149641 | 6/1999 |
| JP | 11-232681 | 8/1999 |
| JP | 2001-176078 | 6/2001 |
| JP | 2003-067925 | 3/2003 |
| JP | 2003-085761 | 3/2003 |

* cited by examiner

*Primary Examiner*—Thang V. Tran
(74) *Attorney, Agent, or Firm*—Roylance, Abrams, Berdo & Goodman, LLP

(57) ABSTRACT

Disclosed is an optical disk recording and reproducing apparatus and a method for determining an optimal power of a laser beam. The present invention performs recording tests using combination tables, which are formed with a combination of values of parameters for determining an optimal laser beam power. An optimal power parameter is calculated using the combinations not included in the combination tables based on results of the recording tests, to thereby quickly determine optimal parameter values.

11 Claims, 3 Drawing Sheets

FIG. 3

| COMBINATION | P$_P$ | P$_B$ | T$_C$ | T$_L$ |
|---|---|---|---|---|
| 1 | 15mW | 6mW | 5ns | 4ns |
| 2 | 15mW | 7mW | 6ns | 5ns |
| 3 | 15mW | 8mW | 7ns | 6ns |
| 4 | 16mW | 6mW | 6ns | 6ns |
| 5 | 16mW | 7mW | 7ns | 4ns |
| 6 | 16mW | 8mW | 5ns | 5ns |
| 7 | 17mW | 6mW | 7ns | 5ns |
| 8 | 17mW | 7mW | 5ns | 6ns |
| 9 | 17mW | 8mW | 6ns | 4ns |

OPTICAL DISK RECORDING AND REPRODUCING APPARATUS AND METHOD FOR DETERMINING OPTIMAL POWER THEREOF

CROSS-REFERENCE TO RELATED APPLICATION

This application claims the benefit under 35 U.S.C. §119 (a) of Korean Patent Application No. 2003-63383, filed on Sep. 9, 2003, in the Korean Intellectual Property Office, the disclosure of which is incorporated herein by reference in its entirety.

BACKGROUND OF THE INVENTION

1. Field of the Invention

The present invention relates to an optical disk recording and reproducing apparatus and a method for determining optimal power thereof. More particularly, the present invention relates to an optical disc recording and reproducing apparatus and a method for determining the optimal power of a laser beam based on the characteristics of an optical disk in order for data to be optimally recorded onto and read from the optical disk.

2. Description of the Related Art

In general, optical disks are classified into typically three kinds of disks: reproduction-dedicated disks such as compact disk-ROM (CD-ROM), Digital Versatile disk-ROM (DVD-ROM), and the like, write-once recordable disks such as CD-Recordable (CD-R), DVD-R, and the like, and rewritable disks such as CD-Rewritable (CD-RW), DVD-RAM, and the like, depending upon data recording capabilities.

An optical disk recording and reproducing apparatus can drive a laser diode (LD) provided on an optical pickup to record information onto an optical disk or reproduce recorded information from the optical disk. In order to record information onto the optical disk, the optical disk recording and reproducing apparatus drives the laser diode (LD) to irradiate a laser beam of relatively high power since the physical characteristics of an information recording layer existing on the optical disk has to be changed. In order to reproduce information recorded on the optical disk, the optical disk recording and reproducing apparatus drives the laser diode (LD) to irradiate a laser beam of relatively low power since the physical characteristics of the information recording layer do not have to be changed.

However, the optimal recording power changes depending upon the characteristics of each optical disk such as the optical disk kind, the optical disk maker, chemical properties of the recording layers on the optical disks, and so on. Accordingly, most optical disk recording and reproducing apparatuses are designed to perform a process for determining an optimal recording power at the initial stage prior to driving the LD.

In general, the optimal power is determined by performing recording tests on a certain area of an optical disk. However, the number of parameters used to determine the optimal power setting is increasing, as well as the number of consumer optical disk recording and reproducing apparatuses that can record and reproduce information onto and from diverse kinds of optical disks. Accordingly, it takes a substantial amount of time to perform recording tests for all the possible combinations of parameter values, so a method is required to solve such a problem.

SUMMARY OF THE INVENTION

Accordingly, it is an aspect of the present invention to provide an optical disk recording and reproducing apparatus and a method for determining an optimal power for a beam. In order to achieve the above aspect, an optimal power is determined by performing recording tests a predetermined number of times using combination tables, which have multiple combinations of pre-selected parameter values. Final parameter values are determined for the optimal power from the results of the tests.

The combination table includes a limited number of combinations. Embodiments of the present invention perform recording tests using each combination, and compute an optimal value for each parameter in consideration of interrelationships with the other parameters from the various test results. That is, the combinations of values in the combination table are pre-selected values for the recording tests, and any one of the combinations is not determined as an optimal combination, but optimal parameter values are inferred and determined from the results of the various recording tests. By doing so, embodiments of the present invention can determine optimal parameter values in a short time period by considering the mutual influences among parameters from the various recording tests performed up to a predetermined number of times.

Preferably, each combination table is an orthogonal array table formed with a predetermined number of values pre-selected with respect to all the parameters required for optimal power determination. The orthogonal array table has been one of the experimental methods used for finding out an optimal condition with the minimum number of attempts to consider the influences among parameters.

Preferably, at least one combination table is prepared and stored for each kind of optical disk. Therefore, an optical disk recording and reproducing apparatus determines the kind of disk loaded therein, reads out a corresponding combination table from the pre-stored combination tables depending upon the disk kind, and performs recording tests to determine the optimal power for a laser beam.

The parameters to be determined can be easily understood by those skilled in the art to which the present invention pertains. The values of the parameters for performing the recording tests can be easily set through experience and without undue experimentation by those of ordinary skill in the art.

Further, the present invention relates to a method for determining optimal power for recording and reproducing optical disks, so the present invention can be applied to all apparatuses for recording and reproducing optical disks such as CD, DVD, Blu-ray disk (BD), and the like.

BRIEF DESCRIPTION OF THE DRAWINGS

The invention will be described in detail with reference to the following drawings in which like reference numerals refer to like elements, and wherein:

FIG. 3 is a view for illustrating an exemplary combination table for recording tests according to an embodiment of the present invention.

DETAILED DESCRIPTION OF THE PREFERRED EMBODIMENTS

Figure 1:
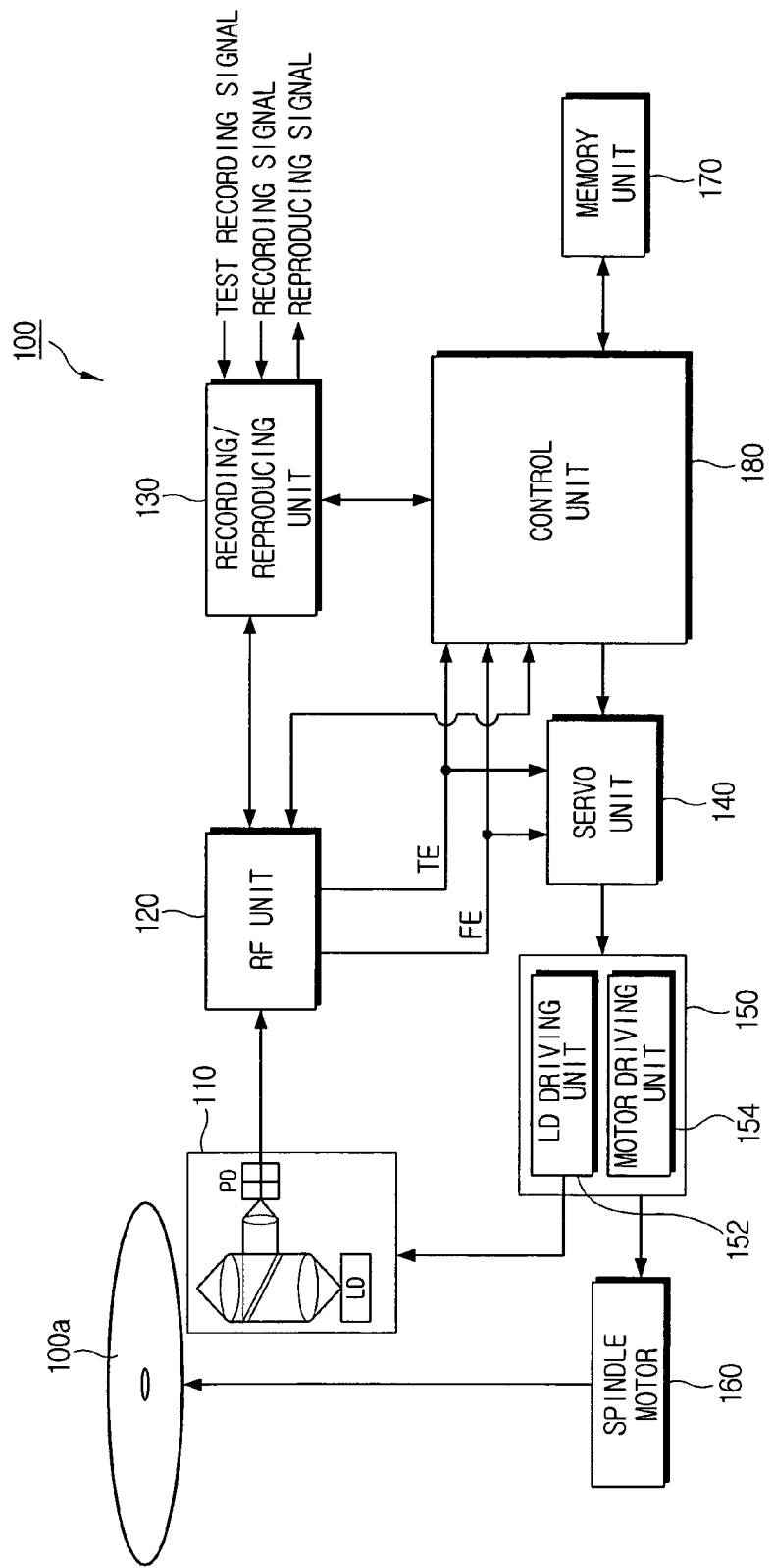
FIG. 1 is a schematic block diagram for showing an exemplary optical disk recording and reproducing apparatus according to an embodiment of the present invention.

Hereinafter, the present invention will be described in detail with reference to the accompanying drawings. FIG. 1 is a schematic block diagram for showing an exemplary optical disk recording and reproducing apparatus according to an embodiment of the present invention. The exemplary optical disk recording and reproducing apparatus 100 according to an embodiment of the present invention has a pickup unit 110, an RF unit 120, a recording and reproducing unit 130, a servo unit 140, a driving unit 150, a spindle motor 160, a memory unit 170, and a control unit 180. FIG. 1 shows only units (shown in blocks) related to the optimal power determination from the optical disk recording and reproducing apparatus 100 according to an embodiment of the present invention, and the other units comprising the apparatus are not shown for ease of explanation.

The pickup unit 110 irradiates a laser beam onto an optical disk 100a to record data, and reads out and reproduces the data recorded on the optical disk 100a. To do this, the pickup unit 110 includes a laser diode (LD) for irradiating a laser beam of certain power onto the optical disk 100a and a focusing actuator for driving the object lens upwards and downwards to precisely focus the beam irradiated from the LD onto the surface of the optical disk 100a. An object lens focuses the beam irradiated from the LD onto the surface of the optical disk 100a. A photo diode (PD) sensor detects a beam reflected from the surface of the optical disk 100a. Finally, a tracking actuator drives the object lens to the left and right in order for the pickup unit 110 to precisely trace the tracks formed on the optical disk 100a.

The RF unit 120 amplifies and rectifies an RF signal output from the pickup unit 110 into a modulated signal, such as an Eight to Fourteen modulation (EFM) signal, and provides the EFM signal to the recording and reproducing unit 130. Further, the RF unit 120 detects a focusing error (FE) and a tracking error (TE) from the RF signal, and applies an FE signal and a TE signal corresponding to the detected errors to the control unit 180 and the servo unit 140.

The recording and reproducing unit 130 records an externally input recording signal on the optical disk 100a according to a recording command signal sent from the control unit 180 which will be later described. The recording and reproducing unit 130 also reads out and reproduces data recorded on the optical disk 100a according to a reproducing command signal. That is, if the recording command signal is input from the control unit 180, the recording and reproducing unit 130 converts a recording signal into a data format for output that can be recorded on the optical disk 100a. The recording signal may also be a test recording signal for setting a recording power, which is input in accordance with the recording command signal. Further, if the reproducing command signal is received from the control unit 180, the recording and reproducing unit 130 reads out the data recorded on the optical disk 100a, and decodes and reproduces the read-out data.

The servo unit 140 controls a focusing servo and a tracking servo based on the TE signal and FE signal that are output from the RF unit 120. Further, the servo unit 140 controls a motor driving unit 154 for controlling the spindle motor 160, which is a driving motor for the optical disk 100a, to be driven at a constant linear velocity (hereinafter, referred to as "CLV"), and an LD driving unit 152 for driving the laser diode to emit a laser beam corresponding to a recording power and a reproducing power. The driving unit 150 has the LD driving unit 152 and the motor driving unit 154.

The LD driving unit 152 drives the laser diode based on the controls of the servo unit 140. For example, the LD driving unit 152 drives the laser diode to output a laser beam corresponding to a recording power and a reproducing power necessary for recording certain data on the optical disk 100a and reproducing the recorded data from the optical disk 100a, respectively.

The motor driving unit 154 supplies to the spindle motor 160 a driving voltage for driving the spindle motor 160 according to a rotation speed control signal for the spindle motor 160 that is output from the servo unit 140. That is, the motor driving unit 154 drives the spindle motor 160 to rotate the optical disk 100a at a constant linear velocity. According to an embodiment of the present invention, the spindle motor 160 is preferably a DC motor for rotating the optical disk 100a, and rotates in forward and reverse directions depending upon the driving voltage supplied from the motor driving unit 154.

The memory unit 170 preferably consists of a ROM for storing control programs for controlling various operations of the optical disk recording and reproducing apparatus 100 and a RAM for temporarily storing various data collected during the various operations. Further, the memory unit 170 according to an embodiment of the present invention stores combination tables, which are arrayed with combinations of pre-selected values with respect to parameters for determining the optimal power for a laser beam emitted from the pickup unit 110. It is preferable that at least one combination table is prepared and stored for each kind of optical disk. Each combination table is formed in an orthogonal array of values pre-selected for parameters required for an optimal laser beam power determination. For example, the various parameters for determining an optimal power may include power-related parameters, such as Write Power, Erase Power, Bias Power, Peak Power, and the like, as well as time-related parameters such as Delay Pulse, Write Pulse, Last Pulse, Off Pulse, and so on. The above parameters are examples of possible parameters and the present invention should not be limited by these examples.

The control unit 180 controls overall operations of the optical disk recording and reproducing apparatus 100 according to the various control programs stored in the memory unit 170. The control unit 180 operates the optical disk recording and reproducing apparatus 100 in a record mode for recording to-be-recorded data (hereinafter, referred to as record data) on a loaded optical disk 100a or in a reproducing mode for reproducing data recorded on the optical disk 100a according to the selected operation mode.

If an optical disk 100a is loaded, the control unit 180 determines the kind of optical disk 100a based on a signal output from the RF unit 120 that corresponds to the loaded optical disk 100a. For example, the control unit 180 determines the kind of optical disk 100a based on the FE signal level output from the RF unit 120. Of course, other methods of determining the kind of optical disk 100a are well known and the present invention should not be limited by this example. The optical disk is classified into any one of CD-ROM, CD-R, CD-RW, DVD-ROM, DVD-R, DVD-RW, and DVD-RAM depending upon the level of the FE signal.

If the loaded optical disk 100a is determined to be a recordable disk such as an R, RW, or RAM, the control unit 180 performs an optimal record power control (OPC) process for determining the optimal power of a beam for the loaded optical disk 100a. The OPC process can be implemented either to be carried out immediately if the optical disk 100a is determined to be a recordable disk or before performing a recording job when an external recording request signal is received. The recording request signal can be received through a key operation unit (not shown) provided on the main body of the optical disk recording and reproducing apparatus 100 or by a remote controller (not shown).

The control unit 180 reads from the memory unit 170 a combination table corresponding to the kind of loaded optical disk 100a. Using the combinations read from the combination table, the control unit 180 performs recording tests and determines an optimal power based on the results of the recording tests.

For a detailed description, the control unit 180 temporarily stores in the memory unit 170 a first jitter value which is a first recording state information value obtained from the recording tests done with the combinations listed in the combination table. Further, the control unit 180 predicts a result value using a combination of parameter values not included in the combination table based on the jitter value stored in the memory unit 170. Using the predicted result value, the control unit 180 calculates a second jitter value which is a second recording state information value. The control unit 180 decides on an optimal combination, which is a combination having the minimum jitter value from the first recording state information value and the second recording state information value. A more detailed description of a method for deciding the optimal combination will be made later.

The control unit 180 stores in the memory unit 170 values of the parameters corresponding to the decided optimal combination. Thereafter, if the recording request signal is received through the key operation unit, the control unit 180 processes a recording job with optimal parameter values stored in the memory unit 170.

Hereinafter, descriptions are made of an optimal power determination method according to a preferred embodiment of the present invention with reference to FIGS. 1 through 3.

Figure 2:
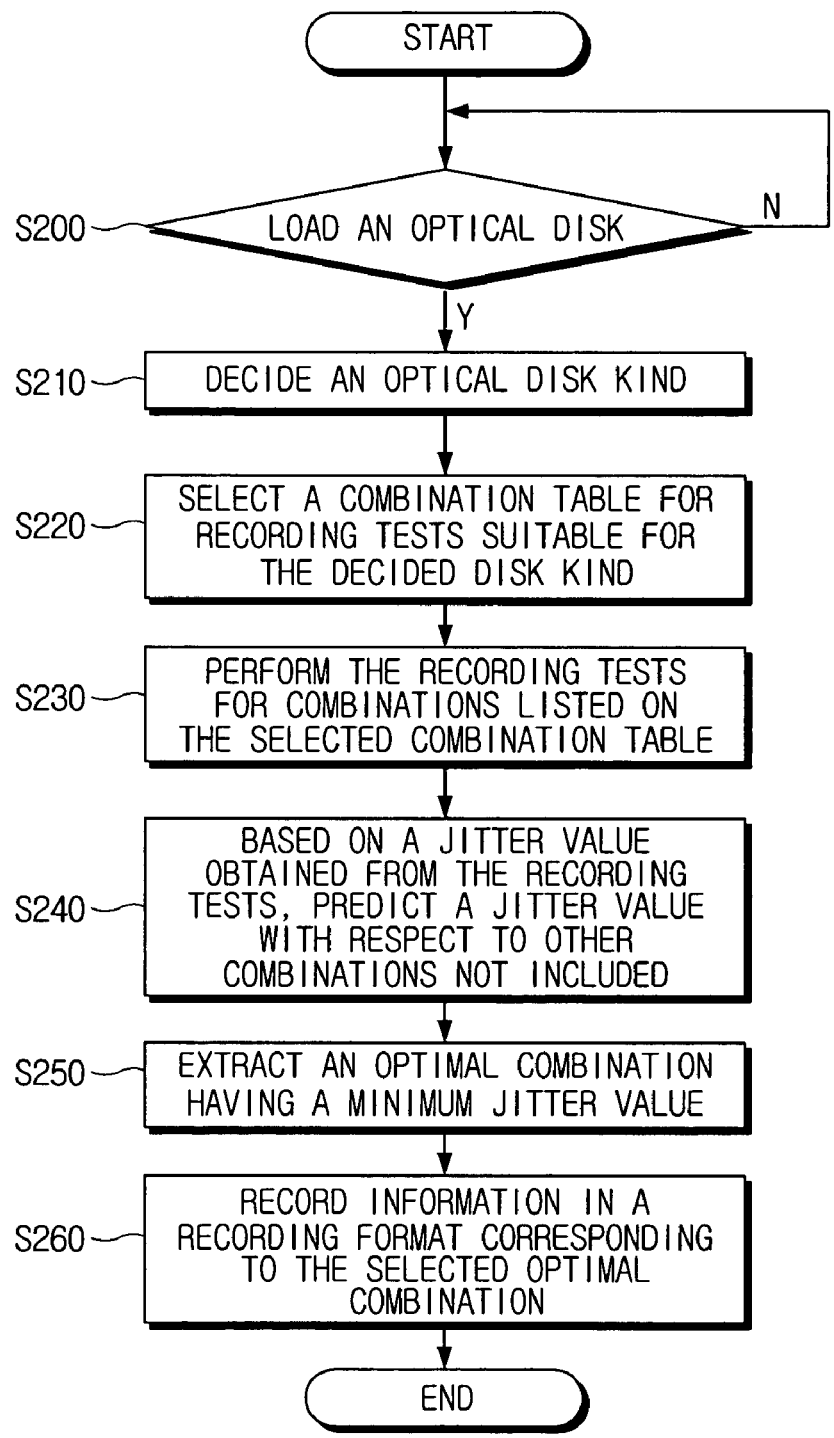
FIG. 2 is a flow chart for explaining an optimal power determination method according to an embodiment of the present invention for the exemplary optical disk recording and reproducing apparatus of FIG. 1.

Referring to FIGS. 1 through 3, if an optical disk 100a is loaded in the optical disk recording and reproducing apparatus 100 (S200), the control unit 180 recognizes the kind of optical disk 100a loaded into the apparatus (S210). If, for instance, the loaded optical disk 100a is recognized as a recordable disk, the control unit 180 reads out of the memory unit 170 a combination table corresponding to the kind of loaded optical disk 100a (S220), which, in this case, is a recordable disk.

FIG. 3 illustrates an exemplary combination table corresponding to a disk requiring four parameters such as Peak Power (PP), Bias Power (PB), Cooling Pulse (TC), and Last Pulse (TL) in order to determine an optimal power. Each parameter has preferably three different pre-selected parameter values. That is, there are 15 mW, 16 mW, and 17 mW selected for the PP value, 6 mW, 7 mW, and 8 mW selected for the PB value. Further, there are 5 ns, 6 ns, and 7 ns selected for the TC value, and 4 ns, 5 ns, and 6 ns selected for the TL value. However, the present invention is not limited to the parameters and values shown, but can have less parameters or more parameters such as Write Power, Erase Power, Write Pulse, Off Pulse, and the like, in addition to the above parameters according to the characteristics of a loaded optical disk.

The control unit 180 records test data onto the optical disk 100a using the parameter values set in each of the certain combinations (nine combinations as shown in FIG. 3) listed on the read-out combination table, and reproduces the recorded test data to calculate jitter values (S230). At this time, the test data is recorded in a Power Calibration Area (PCA) which is a test area for determining the optimal power.

Further, the control unit 180 predicts a result value with respect to the other combinations for which the recording tests are not carried out, based on the jitter value obtained from a recording test performance, and calculates a second recording state information value (S240). For example, as in FIG. 3, 81 different combinations can be made using four parameters required for an optimal power determination and three predetermined values for each of the four parameters. The present embodiment can determine parameter values for an optimal power without carrying out the recording tests for all 81 combinations. That is, the present invention performs the recording tests for only the nine combinations listed on a combination table, and predicts parameter values as to the other combinations not included on the combination table based on jitter values obtained from the recording test results of the nine listed combinations.

The control unit 180 calculates jitter values for the other combinations for which the recording tests are not performed by using Equation 1 as follows:

$$SNR1 = 10*\log(1/MSD1)$$

$$MSD1 = (y1^2 + y2^2 + y3^2 + \ldots + yn^2) \qquad \text{[Equation 1]}$$

In here, the MSD1 denotes a jitter value obtained through a recording test for the combination 1, and SNR1 denotes a signal-to-noise ratio for the MSD1. Further, y1 to yn denote the number of times the record tests are carried out for combination 1. The SNRs can be calculated with respect to the remaining combinations, that is, combinations 2 through 9, using Equation 1.

If the SNR is calculated with respect to each combination according to the above method, it can be seen how parameter values corresponding to the elements PP, PB, TC, and TL affect SNRs when using the calculated SNR. For example, if an average value over SNR1, SNR2, and SNR3 calculated for combinations 1, 2, and 3 is calculated, it can be seen what an SNR would be in case that the first parameter value (15 mW) of PB is selected, and, if an average value over SNR1, SNR4, and SNR7 calculated for combinations 1, 4, and 7 is calculated, it can be seen what an SNR would be in case that the first PB parameter (6 mW) is selected. In the above method, the SNR can be calculated when the respective parameters are selected with respect to the remaining parameters. In this case, a combination of parameter values having the largest SNR with respect to the respective elements can be predicted as an optimal combination.

The control unit 180 extracts an optimal combination having a minimum jitter value from the actual jitter values obtained from recording test performances and the calculated jitter value predicted based on the actual jitter values (S250). For example, the control unit 180 extracts a predetermined number of combinations out of the 81 combinations, for instance, three combinations, in ascending order of combination jitter values, that is, the least jitter value, the second least jitter value, and the third least jitter value. The recording tests are performed with respect to the predetermined number of extracted combinations, in the above example, three combinations. If the recording tests as to the predetermined number of the extracted combinations are completed, the control unit 180 calculates a jitter value for the predetermined number of combinations for which the recording tests were performed, and determines as an optimal combination the combination having the minimum jitter value from the calculated jitter values. Thus, the recording tests are not necessary for combinations that are not one of the predetermined number of extracted combinations for which recording tests have been carried out.

In another embodiment, the control unit 180 calculates jitter values for the other 72 combinations based on the jitter values obtained through the recording tests of the nine combinations. The control unit 180 extracts a predetermined number of combinations out of the remaining 72 combinations, for example, three combinations, in ascending order of calculated combination jitter values. Further, the control unit 180 carries out the recording tests for the predetermined number of extracted combinations. The control unit 180 compares the jitter values obtained through the recording test results of the three combinations to the jitter values obtained through the recording test performed using the combinations listed in the combination table, and determines as an optimal combination. An optimal combination being the combination having the minimum jitter value as a result of the comparison.

The parameter values that form the optimal combination as determined in the above method are the optimal parameter values for determining an optimal power of a beam. The control unit 180 stores the determined optimal parameter values in the memory unit 170. Thereafter, if a recording request signal is received for recording data through a key operation unit, the control unit 180 processes the recording job with the optimal parameter values stored in the memory unit 170 (S260).

As described so far, the present invention can carry out recording tests in use of combination tables, each formed with combinations of parameter values required for optimal power determination. Additionally, an embodiment of the present invention may predict a result for combinations not included on the combination tables based on jitter values obtained through the recording tests, and determine the optimal parameter values having an optimal power. That is, the present invention can determine optimal parameter values for an optimal power with the recording tests carried out only a predetermined number of times, to thereby reduce the time required for an optimal beam power determination.

Although the preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. An optimal laser beam power determination method for recording information onto and reproducing information from an optical disk, comprising steps of storing a plurality of combination tables having pre-selected parameters:
   performing recording tests using at least one combination from the plurality of combinations of pre-selected parameter values from at least one of a plurality of combination tables; and
   determining optimal values for actual parameters from the results of the recording tests to provide optimal laser beam power.

2. The optimal laser beam power determination method as claimed in claim 1, wherein each combination table is formed in an orthogonal array of parameter values for the optimal laser beam power determination.

3. The optimal laser beam power determination method as claimed in claim 2, wherein the step for determining the optimal values determines a combination of the optimal parameter values based on first recording state information values obtained as a result of the recording tests and second recording state information values calculated from predictions of results for combinations of parameter values not included in the combination tables from the first recording state information values.

4. The optimal laser beam power determination method as claimed in claim 3, further comprising a step for deciding which kind of optical disk has been loaded into an apparatus and reading out a combination table corresponding to the decided kind of loaded optical disk before performing the recording tests, wherein the combination tables are prepared in advance and stored based on the kind of optical disk.

5. The optimal laser beam power determination method as claimed in claim 4, wherein the recording tests are performed by recording test data onto the optical disk and measuring a jitter value calculated from a reproduction signal for the recorded test data.

6. The optimal laser beam power determination method as claimed in claim 5,
   wherein the step for determining the optimal values extracts a predetermined number of combinations calculated to have the least jitter value out of the second recording state values, obtains third recording state information values by performing the recording tests for the extracted combinations, and determines as the optimal combination a combination having the least jitter value out of the first recording state information values and the third recording state information values.

7. An optical disk recording and reproducing apparatus for recording and reproducing information onto and out of an optical disk, comprising:
   a pickup unit for irradiating a beam onto the optical disk and recording or reproducing information;
   a memory unit for storing a plurality of combination tables each formed with combinations of pre-selected values for parameters used to determine the optimal power of the beam irradiated from the pickup unit; and
   a control unit for performing recording tests for each combination in the plurality of combination tables and determining an optimal power of the laser beam based on the results of the recording tests.

8. The optical disk recording and reproducing apparatus as claimed in claim 7,
   wherein the plurality of combination tables are each formed in an orthogonal array of values for parameters for determining the optimal laser beam power.

9. The optical disk recording and reproducing apparatus as claimed in claim 8,
   wherein the control unit determines a combination of optimal parameter values based on first recording state information values obtained as a result of the recording tests and second recording state information values calculated from combinations of parameter values not included in the combination tables from the first recording state information values.

10. The optical disk recording and reproducing apparatus as claimed in claim 9,
    wherein the combination tables are prepared and stored in the memory unit by optical disk kind, and the control unit decides which kind of optical disk is loaded and reads out a combination table corresponding to the decided kind of the loaded optical disk before performing the recording tests; and
    performing the recording tests for determining the optimal laser beam power.

11. The optical disk recording and reproducing apparatus as claimed in claim 10,
wherein the optimal power is determined by extracting the predetermined number of combinations predicted to have the least jitter value out of the second recording state values, obtaining third recording state information values through recording test performances for the extracted combinations, and selecting a combination having the least jitter value out of the first recording state information values and the third recording state information values.

* * * * *